United States Patent
He et al.

(10) Patent No.: US 10,187,236 B2
(45) Date of Patent: Jan. 22, 2019

(54) COMMUNICATION NODE AND METHOD THEREIN FOR TRANSMISSION USING A PRECODED MULTI-CARRIER MODULATION SCHEME IN A WIRELESS COMMUNICATION NETWORK

(71) Applicant: Telefonaktiebolaget LM Ericsson (publ), Stockholm (SE)

(72) Inventors: Ning He, Sollentuna (SE); Johan Axnäs, Solna (SE); Robert Baldemair, Solna (SE); Stefan Parkvall, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/522,502

(22) PCT Filed: Nov. 12, 2015

(86) PCT No.: PCT/SE2015/051211
§ 371 (c)(1),
(2) Date: Apr. 27, 2017

(87) PCT Pub. No.: WO2016/085383
PCT Pub. Date: Jun. 2, 2016

(65) Prior Publication Data
US 2017/0338986 A1    Nov. 23, 2017

Related U.S. Application Data

(60) Provisional application No. 62/083,346, filed on Nov. 24, 2014.

(51) Int. Cl.
*H04L 27/26* (2006.01)
*H04L 5/00* (2006.01)

(52) U.S. Cl.
CPC ...... *H04L 27/2602* (2013.01); *H04L 27/2613* (2013.01); *H04L 27/2614* (2013.01);
(Continued)

(58) Field of Classification Search
CPC ............. H04L 27/2602; H04L 27/2636; H04L 5/0044; H04L 5/0046; H04L 27/2607
See application file for complete search history.

(56) References Cited

U.S. PATENT DOCUMENTS

| 8,628,781 B2 | 1/2014 | Sanders |
| 2007/0086368 A1 | 4/2007 | Lee et al. |

(Continued)

FOREIGN PATENT DOCUMENTS

| EP | 2672774 A1 | 12/2013 |
| GB | 2424805 A | 10/2006 |

(Continued)

OTHER PUBLICATIONS

International Search Report and Written Opinion of the International Searching Authority for International Application No. PCT/SE2015/051211 (dated Jun. 2, 2016).

(Continued)

*Primary Examiner* — Freshteh N Aghdam
(74) *Attorney, Agent, or Firm* — Sage Patent Group

(57) ABSTRACT

A method performed by a communication node for transmission using a precoded multi-carrier modulation scheme in a wireless communications network is provided. The communication node splits a precoded multi-carrier symbol into at least a first symbol part and at least a second symbol part. Also, the communication node modulates the at least first and second symbol parts such that the first symbol part of the precoded multi-carrier symbol is used for transmission of a reference signal and the second symbol part of the precoded multi-carrier symbol is used for transmission of (Continued)

data and/or control information. Then, the communication node transmits the reference signal and the data and/or control information in the modulated precoded multi-carrier symbol.

21 Claims, 8 Drawing Sheets

(52) U.S. Cl.
CPC ........ *H04L 27/2636* (2013.01); *H04L 5/0044* (2013.01); *H04L 5/0046* (2013.01); *H04L 27/2607* (2013.01)

(56) References Cited

U.S. PATENT DOCUMENTS

| | | | |
|---|---|---|---|
| 2008/0170633 A1 | 7/2008 | Karino | |
| 2010/0027512 A1* | 2/2010 | Kishiyama | H04L 5/0044 370/336 |
| 2010/0309775 A1* | 12/2010 | Muharemovic | H04J 13/0062 370/210 |
| 2011/0310835 A1* | 12/2011 | Cho | H04L 5/0042 370/329 |
| 2012/0087393 A1* | 4/2012 | Jeong | H04L 5/0051 375/130 |
| 2012/0287874 A1* | 11/2012 | Oketani | H04L 27/0014 370/329 |
| 2013/0279614 A1 | 10/2013 | Walton | |
| 2014/0003544 A1* | 1/2014 | Oketani | H04L 27/261 375/259 |
| 2014/0106740 A1 | 4/2014 | Zhou et al. | |
| 2014/0153420 A1* | 6/2014 | Garin | H04B 7/0671 370/252 |

FOREIGN PATENT DOCUMENTS

| | | |
|---|---|---|
| WO | 2008/007375 | 1/2008 |
| WO | 2009/014764 | 1/2009 |
| WO | WO 2014/056517 A1 | 4/2014 |
| WO | 2014/121833 | 8/2014 |

OTHER PUBLICATIONS

Texas Instruments, "Uplink Reference Signals in Support of High-Speed UEs," 3GPP TSG RAN WG1 #51, R1-074678, Jeju, Korea, Nov. 5-9, 2007, 6 pages.
International Search Report of the International Searching Authority for International Application No. PCT/SE2015/050629, dated Feb. 19, 2016, 4 pages.
Corrected International Search Report of the International Searching Authority for International Application No. PCT/SE2015/050626, dated Apr. 29, 2016, 4 pages.
Supplementary European Search Report, EP 158631110.1, dated May 22, 2018, 15 pages.
European Search Report dated Jun. 4, 2018, European Patent Application No. EP 15863678.7, 7 pages.

* cited by examiner

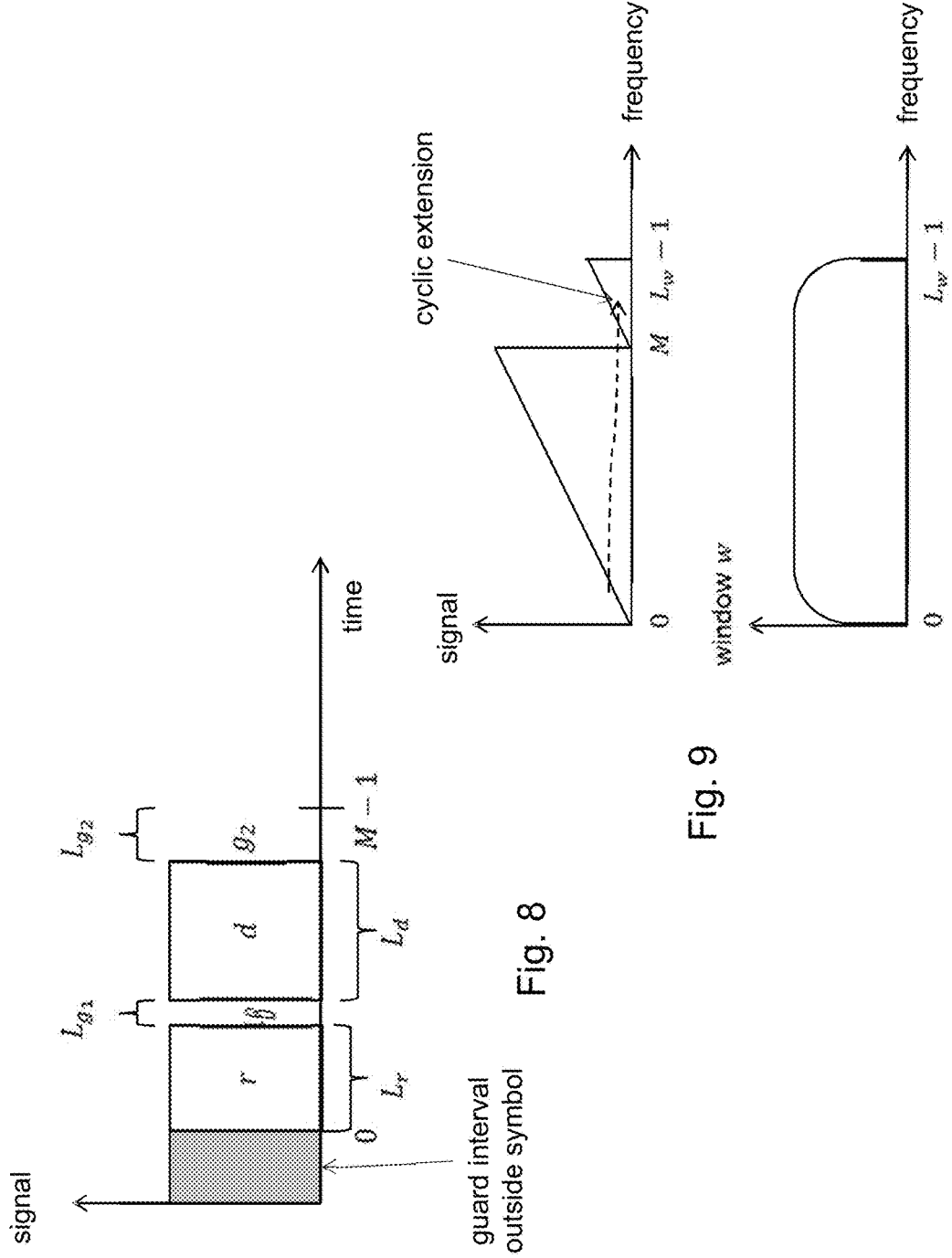

COMMUNICATION NODE AND METHOD THEREIN FOR TRANSMISSION USING A PRECODED MULTI-CARRIER MODULATION SCHEME IN A WIRELESS COMMUNICATION NETWORK

CROSS REFERENCE TO RELATED APPLICATION

This application is a 35 U.S.C. § 371 national stage application of PCT International Application No. PCT/SE2015/051211, filed on Nov. 12, 2015, which in turn claims priority to U.S. Provisional Application No. 62/083,346, filed on Nov. 24, 2014, the disclosures and content of which is incorporated by reference herein in its entirety.

TECHNICAL FIELD

Embodiments herein relate to precoded multi-carrier transmission in a wireless communications network. In particular, embodiments herein relate to a communication node and a method therein for transmission using a precoded multi-carrier modulation scheme in a wireless communications network. The communication node may be a wireless device or a network node in the wireless communication network.

BACKGROUND

In a typical radio communications network, wireless terminals, also known as mobile stations, terminals and/or user equipments, UEs, communicate via a Radio Access Network, RAN, to one or more core networks. The radio access network covers a geographical area which is divided into cell areas, with each cell area being served by a base station or network node, e.g. a radio base station, RBS, which in some networks may also be referred to as, for example, "NodeB", "eNB" or "eNodeB".

A Universal Mobile Telecommunications System, UMTS, is a third generation mobile communication system, which evolved from the second generation, 2G, Global System for Mobile Communications, GSM. The UMTS terrestrial radio access network, UTRAN, is essentially a RAN using wideband code division multiple access, WCDMA, and/or High Speed Packet Access, HSPA, to communicate with user equipments. In a forum known as the Third Generation Partnership Project, 3GPP, telecommunications suppliers propose and agree upon standards for third generation networks and UTRAN specifically, and investigate enhanced data rate and radio capacity. In some versions of the RAN as e.g. in UMTS, several base stations may be connected, e.g., by landlines or microwave, to a controller node, such as a radio network controller, RNC, or a base station controller, BSC, which supervises and coordinates various activities of the plural base stations/network nodes connected thereto. The RNCs are typically connected to one or more core networks.

Specifications for the Evolved Packet System, EPS, have been completed within the 3rd Generation Partnership Project, 3GPP, and this work continues in the coming 3GPP releases. The EPS comprises the Evolved Universal Terrestrial Radio Access Network, E-UTRAN, also known as the Long Term Evolution, LTE, radio access, and the Evolved Packet Core, EPC, also known as System Architecture Evolution, SAE, core network. E-UTRAN/LTE is a variant of a 3GPP radio access technology wherein the radio base station nodes are directly connected to the EPC core network rather than to RNCs. In general, in E-UTRAN/LTE the functions of a RNC are distributed between the radio base stations nodes, e.g. eNodeBs in LTE, and the core network. As such, the Radio Access Network, RAN, of an EPS has an essentially flat architecture comprising radio base station nodes without reporting to RNCs.

Precoded Multi-Carrier Signal

FIG. 1 shows an example of precoded multi-carrier signalling. In precoded multi-carrier signalling, a multi-carrier modulator is not directly fed with data in the frequency domain but data is first precoded and then applied to the subcarriers of the multi-carrier modulator. The multi-carrier modulator may, for example, be configured for Orthogonal Frequency Division Multiplexing, OFDM, but may also be configured for any other multi-carrier modulation scheme, such as, e.g. Filter Bank Multi-Carrier, FBMC.

The precoding transformation may be performed by any precoder that enables a certain desired property at the output of the multi-carrier modulator. In many cases, the precoding is used to generate a low Peak-to-Average Power Ratio, PAPR, signal at the output of the multi-carrier modulator. For example, when the multi-carrier modulator is an OFDM modulator, a common choice of precoder is the Discrete Fourier Transform, DFT. Here, the precoded multi-carrier scheme may be the well-known DFT-spread OFDM, DFTS-OFDM, signalling scheme as used in the LTE uplink. According to another example, when the multi-carrier modulator is an FBMC modulator, one choice that reduces PAPR at the output of the FBMC modulator is to perform precoding with a filter bank transformation.

In case of DFTS-OFDM, the output signal for block i may be written as Eq. 1, wherein the subscript i has been omitted for simplicity:

$$y = F_N^H S F_M x, \quad (\text{Eq. 1})$$

where $F_M$ and $F_N$ are the DFT matrices of size M and N, respectively, wherein M is the number of allocated subcarrier and N is the IDFT size of the OFDM modulator. The N×M matrix S maps the output of the precoding operations to the M allocated subcarriers and has exactly one "1" and otherwise only "0" in each column.

For a contiguous mapping of the M subcarriers as described in Eq. 2, $$S = \begin{bmatrix} 0_{L_{0_1}} \\ I_M \\ 0_{L_{0_2}} \end{bmatrix}, \quad (\text{Eq. 2})$$

where the M×M identity matrix $I_M$ and $$0_{L_{0_1}}$$

and $$0_{L_{0_2}}$$

all zero matrices of size $L_{0_1} \times M$ and $L_{0_2} \times M$, respectively. Non-contiguous mappings such as interleaved mapping are possible as well. The data vector to transmit is the M element vector x.

Typically a guard interval is prefixed to the output signal y to enable simple frequency-domain equalization at the receiver. The guard interval may either be a true guard interval, such as, e.g. an L-element long zero vector, or a cyclic prefix, CP, such as, e.g. a copy of the last L elements of y, as is shown in FIGS. 2-3. In both these cases, the signal with guard interval can be written as Eq. 3:

$$\tilde{y}=Py=PF^H_N SF_M x, \qquad (Eq.\ 3)$$

where P is the matrix inserting the true guard interval or cyclic prefix.

Frame Structure

Transmissions in wireless communication networks are often organized in terms of frames or subframes. Each frame or subframe is a group of transmission resources, e.g. time-frequency resources, which comprise both at least one control field and at least one data field, i.e. field for payload data. Typically, the control field appears in the beginning of the frame or subframe and comprise control information, such as, e.g. information about how the data in the data field of the frame or subframe is encoded and modulated. The control field may also comprise control information related to data transmission in the reverse link direction, i.e. data transmitted from the receiver of the control information, such as, e.g. ACK/NACK reports or Channel State Information, CSI.

A possible frame structure of a wireless communication network is illustrated in FIG. 4. Any two communication nodes which are communicating may in principle arbitrarily select which of the two control fields should be used for transmitting, Tx, and which of the two control fields should be used receiving, Rx. This is shown in the upper left and right illustrations in FIG. 4.

However, this arbitrary selection may require complicated negotiation procedures between the communication nodes, and hence it is often more practical to have a general rule for the system. One example of this is shown in the lower left and right illustrations in FIG. 4, where one of the control fields is always used for downlink transmission, DL Tx, such as, e.g. transmission by access or network nodes in the wireless communication network, and the other control field is always used for uplink transmission, UL Tx, such as, e.g. transmission by wireless devices.

Note also that frames on different links in the system should preferably be time-aligned, partly because this enables communication nodes, such as, wireless devices and network nodes, to more freely and efficiently change the communication node with which it communicates from one frame to another, e.g. without waiting for the another communication link to finish its frame.

The control and data fields are often further divided into smaller units. For example, in an OFDM-based wireless communication networks, the control and data fields are further divided into one or more OFDM symbols. This is also true for other networks, such as, e.g. networks based on DFTS-OFDM, FBMC, etc. Hereinafter, such units may be referred to as symbols. Some fields may comprise only a single symbol.

Half-Duplex

If a wireless communication network does not use a paired spectrum, i.e. different frequency bands for the two link directions, as millimeter-wave, mmW, networks typically don't do, it is normally necessary to limit communication to half-duplex. Half-duplex means that transmission may at any one time instance occur only in one of the two link directions, i.e. directions of communication, such as, transmitting or receiving.

Hence, in this case, Time-Division Duplex, TDD, has to be used. One reason for this limitation is that a communication node that is transmitting, such as, e.g. an access or network node or wireless device, saturates its own analog receiving circuitry due to strong overhearing between transmit and receive antennas. In half-duplex systems, it may be useful to have two control fields for control information in every frame, one for each link direction. The two directions of a link may be referred to as Tx/Rx directions or duplex directions. In other words, a communication node may use one of the control fields for Tx and the other control field for Rx.

It should also be noted that within each of the three fields, i.e. the two control fields and the data field, there may typically also be other signals interspersed, such as, e.g. reference or pilot signals carrying reference signal information, to allow the receiver to perform channel estimation.

As shown in FIG. 4, each field typically comprises reference signal information plus data and/or control information. In case of OFDM multi-carrier signaling, this information may be multiplexed into the same symbol by using different subcarriers.

However, when having a precoded multi-carrier signal, such as, e.g. DFTS-OFDM, assigning one set of frequencies to reference signal information and another set of frequencies to data and/or control information will increase the Peak-to-Average Power Ratio, PAPR. This is a problem since a low PAPR is the reason for using precoded multi-carrier signaling in the first place.

One solution is to dedicate or reserve at least one OFDM symbol to reference signal information and at least another OFDM symbol to data and/or control information. However, a complete OFDM symbol dedicated or reserved for strictly reference signal information will result in a large signaling overhead for the reference signal information.

SUMMARY

It is an object of embodiments herein to reduce overhead signalling in a wireless communication network.

According to a first aspect of embodiments herein, the object is achieved by a method performed by a communication node for transmission using a precoded multi-carrier modulation scheme in a wireless communications network. The communication node splits a precoded multi-carrier symbol into at least a first symbol part and at least a second symbol part. Also, the communication node modulates the at least first and second symbol parts such that the first symbol part of the precoded multi-carrier symbol is used for transmission of a reference signal and the second symbol part of the precoded multi-carrier symbol is used for transmission of data and/or control information. Then, the communication node transmits the reference signal and the data and/or control information in the modulated precoded multi-carrier symbol.

According to a second aspect of embodiments herein, the object is achieved by a communication node for transmission using a precoded multi-carrier modulation scheme in a wireless communications network. The communication node is configured to split a precoded multi-carrier symbol into at least a first symbol part and at least a second symbol part. Also, the communication node is configured to modulate the at least first and second symbol parts such that the first symbol part of the precoded multi-carrier symbol is used for transmission of a reference signal and the second symbol part of the precoded multi-carrier symbol is used for transmission of data and/or control information. The communication node is further configured to then transmit the reference signal and the data and/or control information in the modulated precoded multi-carrier symbol.

By having a communication node as described above, different parts of a precoded multi-carrier symbol may be flexibly allocated either to a reference signal or to data and/or control information. This enables only a fraction of the precoded multi-carrier symbol to be dedicated to a reference signal, which decreases the signaling overhead of the reference signal and leaves more transmission resources to be used for data and/or control information.

Hence, overhead signalling in the wireless communication network is reduced.

BRIEF DESCRIPTION OF THE DRAWINGS

Embodiments will now be described in more detail in relation to the enclosed drawings.

FIG. 8 is a schematic block diagram depicting an example of partitioning of a precoded multi-carrier symbol according to embodiments of a method and a communication node in a wireless communication network, FIG. 9 is an illustration depicting an example of a precoded multi-carrier signal and a window function according to embodiments of a method and communication node in a wireless communication network.

DETAILED DESCRIPTION

Figure 1:
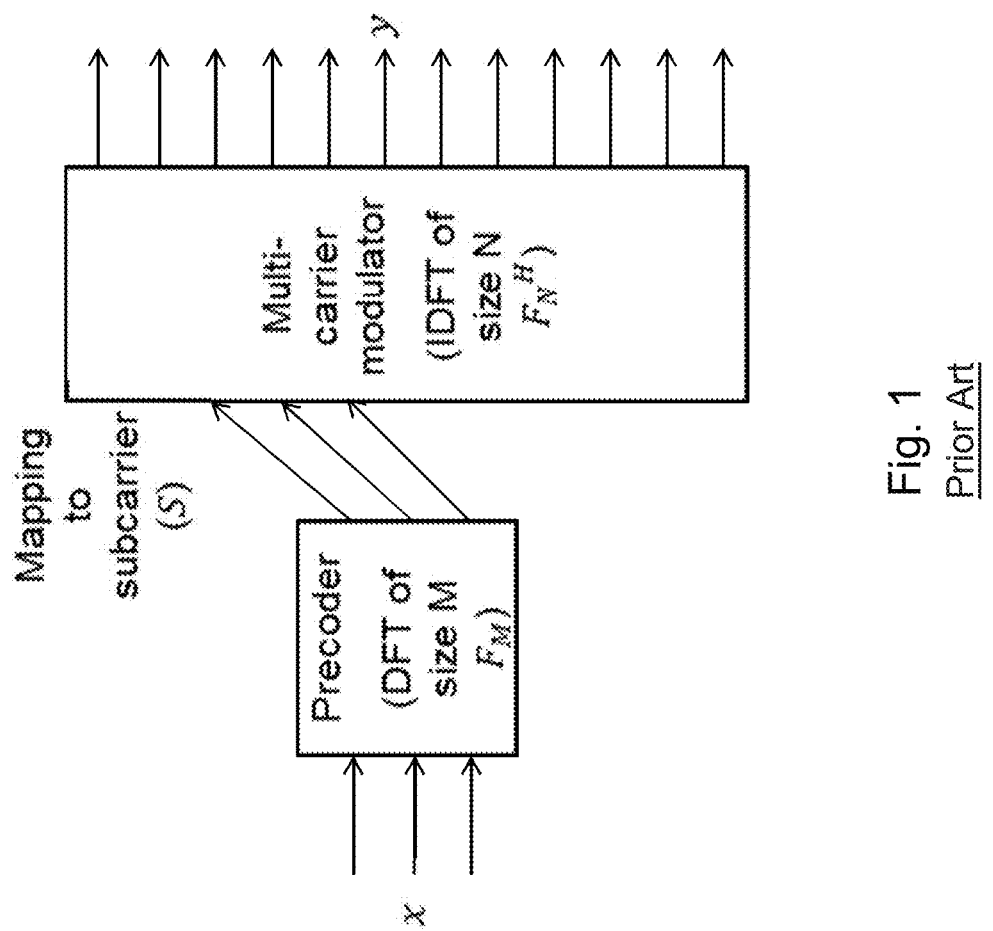
FIG. 1 is a schematic block diagram depicting an example of precoded multi-carrier signalling.
Figure 2:
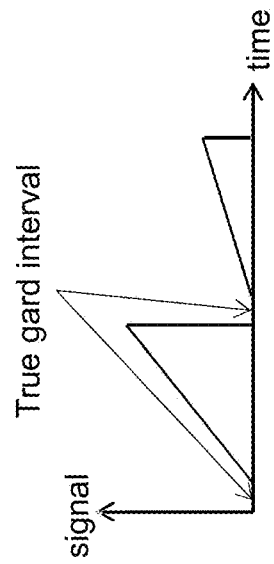
FIG. 2 is a schematic illustration depicting a cyclic prefix as a guard interval.
Figure 3:
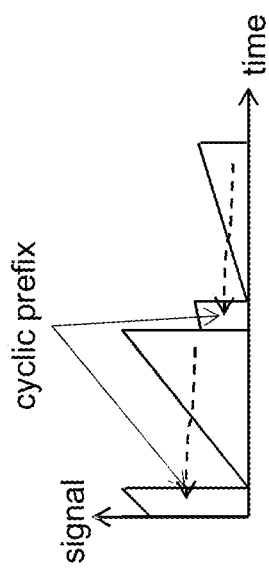
FIG. 3 is a schematic illustration depicting a true guard interval as a guard interval.
Figure 4:
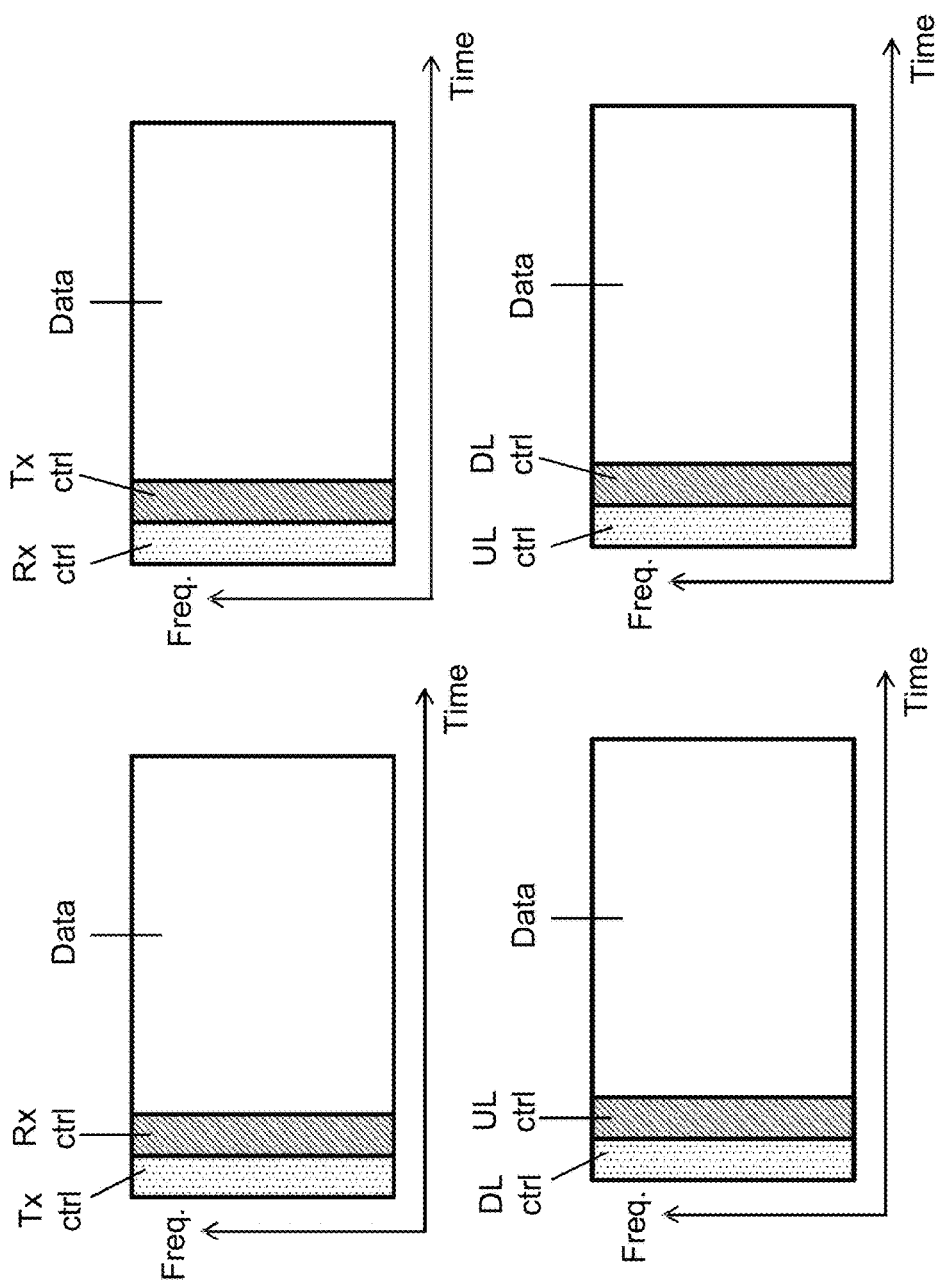
FIG. 4 is a schematic block diagram illustrating possible frame structures in the wireless communication network.

The figures herein are schematic and simplified for clarity, and they merely show details which are essential to the understanding of the embodiments presented herein, while other details have been left out. Throughout, the same reference numerals are used for identical or corresponding parts or steps.

Figure 5:
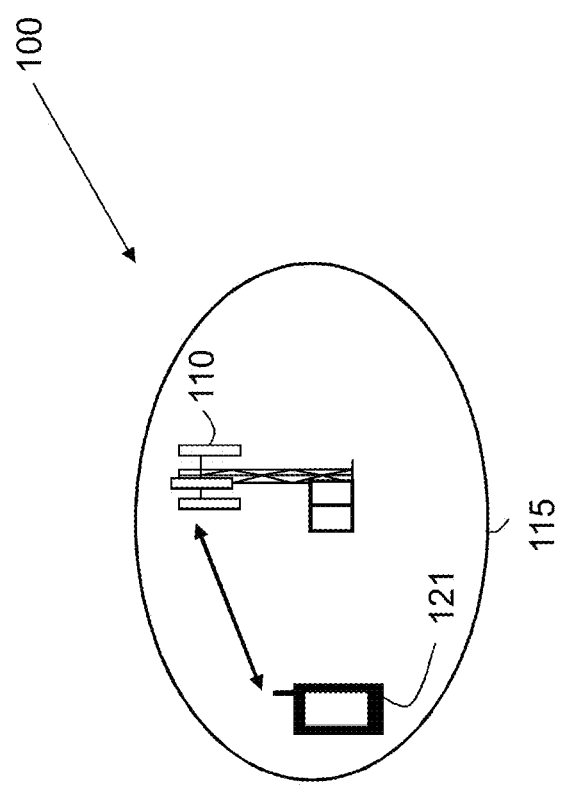
FIG. 5 is a schematic block diagram illustrating embodiments of communication nodes in a wireless communications network.

FIG. 5 depicts a wireless communications network 100 in which embodiments herein may be implemented. In some embodiments, the wireless communications network 100 may be a radio communications network such as a Long Term Evolution (LTE) network. Although, the radio communication network is exemplified herein as an LTE network, the radio communications network may also employ technology of any one of LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), Ultra Mobile Broadband (UMB) or GSM, 5G, or any other similar network or system. The wireless communications network 100 may also be an Ultra Dense Network, UDN, which e.g. may transmit on millimeter-waves (mmW).

The radio communications system 100 comprises a network node 110. The network node 110 serves at least one coverage area 115. The coverage area 115 may in some cases also be referred to as a cell. The network node 110 may correspond to any type of radio network node or any network node, which communicates with a wireless communication device and/or with another network node, such as, e.g. be a base station, a radio base station, eNB, eNodeB, a Home Node B, a Home eNode B, femto Base Station (BS), pico BS, etc. Further examples of the network node 110 may also be e.g. a repeater, base station (BS), multi-standard radio (MSR) radio node such as MSR BS, eNodeB, network controller, radio network controller (RNC), base station controller (BSC), relay, donor node controlling relay, base transceiver station (BTS), access point (AP), transmission points, transmission nodes, a Remote Radio Unit (RRU), a Remote Radio Head (RRH), nodes in distributed antenna system (DAS), core network node (e.g. MSC, MME, etc.), O&M, OSS, SON, positioning node (e.g. E-SMLC), MDT, etc.

In FIG. 5, a wireless communication device 121 is located within the coverage area 115. The wireless communication device 121 is configured to communicate within the radio communications network 100 via the network node 110 over a radio link served by the network node 110. The wireless communication device 121 may refer to any type of communication device or user equipment (UE) communicating with a network node and/or with another communication device in a cellular, mobile or radio communication network or system. Examples of such a wireless communication device are mobile phones, cellular phones, Personal Digital Assistants (PDAs), smart phones, tablets, sensors and actuators equipped with a UE, Laptop Mounted Equipment (LME) (e.g. USB), Laptop Embedded Equipments (LEEs), Machine Type Communication (MTC) devices, or Machine to Machine (M2M) device, Customer Premises Equipment (CPE), target device, device-to-device (D2D) wireless device, wireless device capable of machine to machine (M2M) communication, etc.

Figure 6:
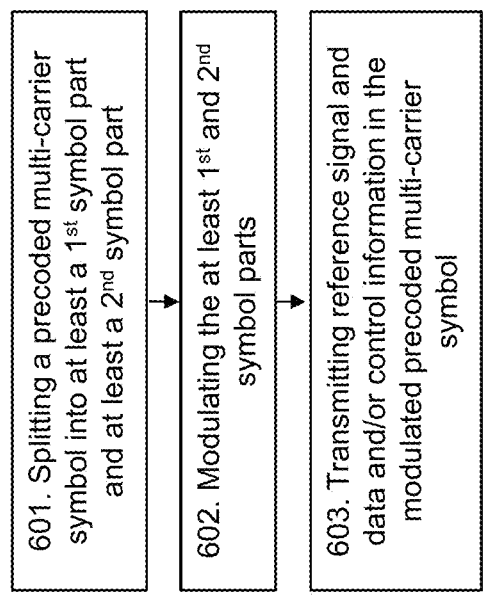
FIG. 6 is a flowchart depicting embodiments of a method in a communication node.

Example of embodiments of a method performed by a communication node 121, 110 for transmission using a precoded multi-carrier modulation scheme in a wireless communications network 100, will now be described with reference to the flowchart depicted in FIG. 6. FIG. 6 illustrates an example of actions or operations which may be taken by the communication node 121, 110. The communication node 121, 110 may in some embodiment be a wireless device 121 or a network node 110 in the wireless communication network 100.

It should be noted that although the following description of the embodiments herein may be describe within the context of DTFS-OFDM, the same embodiments may also be applied to any other wireless communication network using pre-coded multi-carriers, such as, e.g. precoded Filter-Bank Multi-Carrier, FBMC.

Actions 601

First, the communication node 121, 110 splits a precoded multi-carrier symbol into at least a first symbol part and at least a second symbol part. This may also be referred to a separating or partitioning. Furthermore, the first symbol part of the precoded multi-carrier symbol may also be referred to as the first part of the precoded multi-carrier symbol, while the second symbol part of the precoded multi-carrier symbol may also be referred to as the second part of the precoded multi-carrier symbol. It should be noted that even though at the input of the modulator the parts are not overlapping, at the output of the modulator the two portions may spill a bit into each other and thus overlap.

As previously noted, the output y relation to the input x in the context of DTFS-OFDM may be described by Eq. 4:

$$y = F_N^H S F_M x, \quad (Eq. 4)$$

where x is the vector that comprises the elements to be transmitted.

Here, the communication node 121, 110 may split or partition the vector x according to Eq. 5:

$$x = [r^T\ g_1^T\ d^T\ g_2^T]^T, \quad (Eq. 5)$$

where r is the reference signal column vector of length $L_r$; $g_1$ and $g_2$ are guard interval column vectors of length $L_{g1}$, and $L_{g2}$; and d is the data/control column vector of length $L_d$. This is, for example, shown in FIG. 8.

It should be noted that in this example, x is split into two parts, but this may according to some embodiments, be extended to more parts, i.e. more than a first and a second symbol part, such as, e.g. a first, second and third symbol part. For example, the precoded multi-carrier symbol may be divided into any number of parts. It should also be noted that the order of reference signal part and data/control part is not important, i.e. data and/or control information may precede reference signal information.

In some embodiments, the communication node 121, 110 may determine different amounts of energy to the first part of the precoded multi-carrier symbol and to the second part of the precoded multi-carrier symbol. Since the fractions of the symbol duration allocated to the reference signal and to the data and/or control information is flexible, it allows the communication node 121, 110 to assign an amount of energy to the reference signal that is different than the energy that it assigns to the data and/or control information.

In view of the DTFS-OFDM example described above in Eqs. 4-5, this may be performed, for example, by adjusting the length of the reference signal $L_r$, and thereby adjust the energy of the reference signal. This may also be performed, for example, by allocating different transmit power levels to the reference signal and the data and/or control signal. This may be useful when adapting the reference signal information for different channel conditions. For example, depending on the Signal-to-Noise ratio, SINR, different amounts of energy in the reference signal is needed to obtain a good enough estimate of the wireless communication channel at the receiver. The estimate of the wireless communication channel is needed for demodulating the data and/or control information at the receiver.

In some embodiments, the communication node 121, 110 may determine at least one guard period in the precoded multi-carrier symbol such that the total duration of the at least one guard period and the at least first and second parts of the precoded multi-carrier symbol is equal to the duration of a precoded multi-carrier symbol. This may be performed for any number of symbols parts.

Here, the communication node 121, 110 may also, according to some embodiments, determine a first guard period in the precoded multi-carrier symbol located after the first part of the precoded multi-carrier symbol and a second guard period in the precoded multi-carrier symbol located after the second part of the precoded multi-carrier symbol. This may be performed when having a first and a second symbols part.

In some embodiments, the first and second guard interval may here also be inserted before and after the first part of the precoded multi-carrier symbol. For example, the communication node 121, 110 may determine a first guard period in the precoded multi-carrier symbol located after the first symbol part of the precoded multi-carrier symbol and a second guard period in the precoded multi-carrier symbol located before the second symbol part of the precoded multi-carrier symbol.

In some embodiments, the at least one guard period may be a null-fix, i.e. a set of zero-valued samples or a true guard period, or a cyclic prefix. This may be performed to minimize interference from the data/control information part to the reference signal part, i.e. minimize interference from the one of the at least first and second symbol parts carrying data and/or control information to the one of the at least first and second symbol parts carrying the reference signal.

In view of the DTFS-OFDM example described above in Eqs. 4-5, this may be performed, for example, by the vectors $g_1$ and $g_2$ being true guard intervals, i.e. $g_1 = 0_{L_{g1}}$ and $g_2 = 0_{L_{g2}}$ are the all-zero column vectors of length $L_{g_1}$ and $L_{g_2}$, respectively.

In some embodiments, no guard intervals may also be used. In view of the DTFS-OFDM example described above, this may be performed, for example, by including the case of no guard interval, i.e. $L_{g1} = 0$ and/or $L_{g2} = 0$.

Action 602

The communication node 121, 110 then modulates the at least first and second symbol parts. This is performed such that the first symbol part of the precoded multi-carrier symbol is used for transmission of reference signal information, i.e. a reference signal, and the second symbol part of the precoded multi-carrier symbol is used for transmission of data and/or control information.

In view of the DTFS-OFDM example described above in Eqs. 4-5, after propagating ỹ, where y is extended with a guard interval, cyclic prefix, or another known sequence, through the channel h, the signal may be denoted z̃.

Here, it should be noted that term "another known sequence" mentioned above may here refer to any sequence known to the receiver. This known sequence may then be inserted in the guard interval. This could, for example, be a specific sequence specified in a standard specification.

In a receiver, i.e. in a receiving communication node, after processing the guard interval, transforming the signal into frequency domain, and picking the used subcarriers, the signal may be written as shown Eq. 6:

$$z = A\tilde{z} = \Delta_H F_M x, \quad (Eq.\ 6)$$

where A is the matrix summarizing the guard interval processing, transforming
    the signal into frequency domain, and picking the used subcarriers; and
    $\Delta_H$ is an M×M diagonal matrix with the complex channel transfer weights at the allocated subcarrier frequencies along its diagonal.

Note that in this example the noise is ignored and a state-of-the-art or known cyclic prefix or guard interval technique may be used.

Here, a receiver may perform frequency-domain equalization with equalizer C (either with $\Delta_H^{-1}$ or an MMSE equalizer) followed by an IDFT operation to reconstruct an estimate of x, i.e. as shown in Eq. 7:

$$\hat{x} = F_M^H C z = F_M^H C A \tilde{z} = F_M^H C \Delta_H F_M x. \quad (Eq.\ 7)$$

The M×M diagonal matrix C is here the frequency domain equalizer. Assuming a zero-forcing equalizer, i.e. $C=\Delta_H^{-1}$, above equation simplifies to Eq. 8:

$$\hat{x}=x. \quad (Eq.\ 8)$$

Channel Estimation

However, if the channel is unknown equalization is not possible and the reconstructed signal estimated would be as shown Eq. 9:

$$\hat{x}=F^H_M Z=F^H_M A\hat{z}=F^H_M \Delta_H F_M x, \quad (Eq.\ 9)$$

Here, the individual elements of X interfere with each other. However, since x is constructed as shown in Eq. 10:

$$x=[r^T\ g^T_1\ d^T\ g^T_2]^T, \quad (Eq.\ 10)$$

interference from the data/control information d towards reference signal r should be negligible if the guard intervals $g_1$ and $g_2$ are sufficiently long. Since $\hat{x}$ is reconstructed via frequency-domain processing, $\hat{x}$ is periodic with period M, i.e. it is exactly one signal period. Therefore, a guard interval after d, e.g. $g_2$, is also needed. Alternatively, $g_2$ could also appear before r or $g_2$ could be split into one part in the beginning and the other part in the end of x.

Using the observation that interference from data/control information d to reference signal r decays to a large extent across the guard intervals $g_1$ and $g_2$, the interference may be simply "cut" away by using, e.g. a gating function. In the simplest case, the gating function is "1" at positions corresponding to r and "0" otherwise, i.e. as shown in Eq. 11:

$$u=[1_{L_r}^T\ 0_{M-L_r}^T]^T. \quad (Eq.\ 11)$$

More optimized gating functions that gradually transit from "1" to "0" may also be envisioned. After application of the gating function, the remaining signal components are (almost) only from the reference signal r, i.e. the remaining signal component is approximately the same as if only the reference signals r would have been transmitted. $1_{L_r}$ and $0_{M-L_r}$ are the all-one and all-zero column vectors of size M and $M-L_r$, respectively. Therefore, the following as shown in Eq. 12 holds:

$$F_M \Delta_u \hat{x} = F_M \Delta_u F^H_M A\hat{z} \approx \Delta_H F_M \begin{bmatrix} r \\ 0_{M-L_r} \end{bmatrix} \quad (Eq.\ 12)$$

On the left hand side, the gating function u (via the diagonal matrix $\Delta_u$ which has the gating function along its diagonal) is applied to $\hat{x}$ (to remove interference) and transformed into frequency domain (via $F_M$).

On the right hand side is the frequency-domain signal that would have been received if only the reference signal r would have been transmitted. Therefore, the channel estimate can be calculated as shown in Eq. 13:

$$\hat{H} = [F_M \Delta_u F^H_M A\hat{z}] // \left[F_M \begin{bmatrix} r \\ 0_{M-L_r} \end{bmatrix}\right], \quad (Eq.\ 13)$$

where "//" denotes element-wise division.

Windowing

In some embodiments, the communication node 121, 110 may optionally apply a windowing operation in the frequency domain on the precoded multicarrier symbol. In signal processing, a window function is a mathematical function that is zero-valued outside of a specific interval. Using such a window function in signal processing may be referred to as applying a window operation. Using windowing in the frequency domain—with an appropriate window function—reduces the interference from the first symbol part of the precoded multi-carrier symbol into the second symbol part of the precoded multi-carrier symbol, and vice versa, after the modulator.

In some embodiments, the windowing operation may here be performed using a Hamming or Hanning window. These are both well-known window functions that may be used in various types of signaling processing operations.

Figure 7:
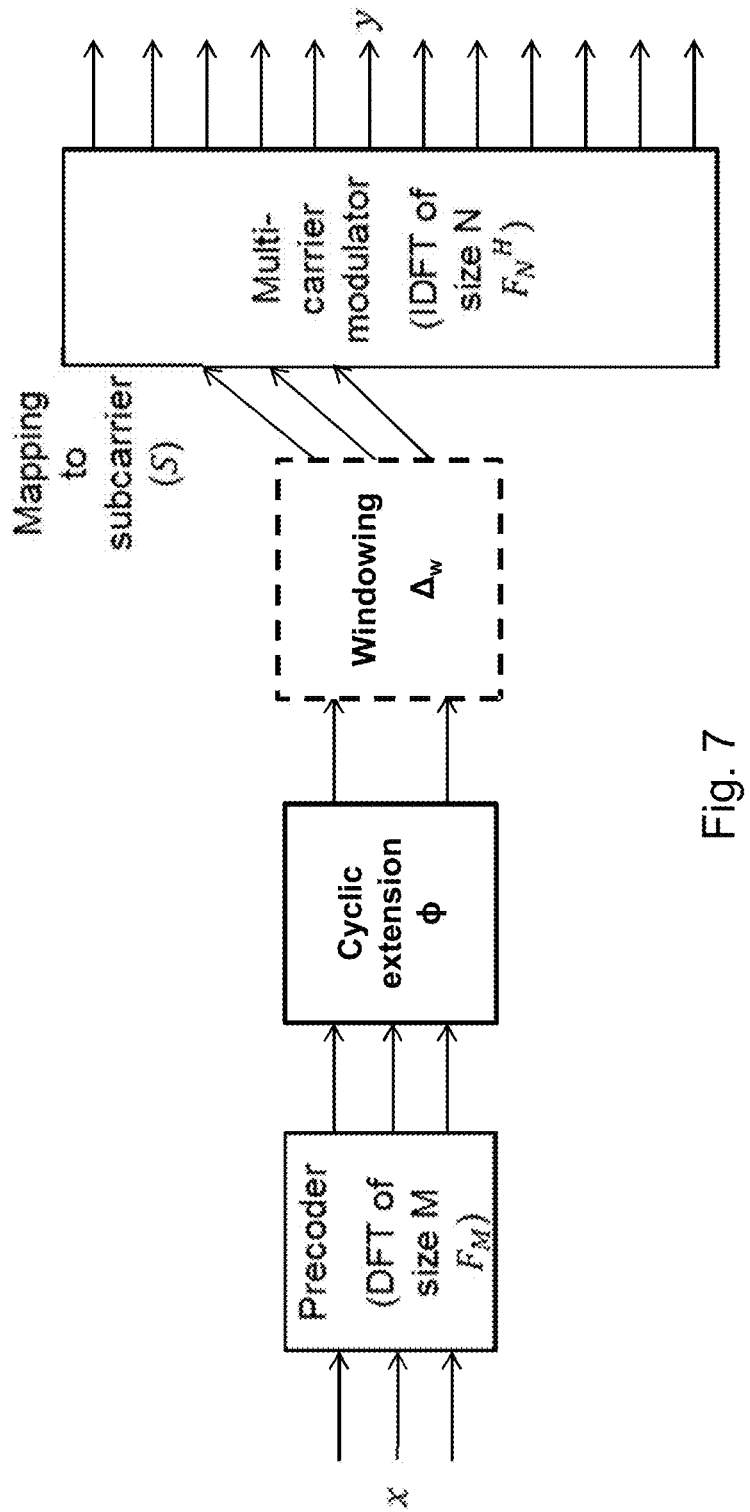
FIG. 7 is a schematic block diagram depicting an example of precoded multi-carrier signalling according to embodiments of a method and a communication node in a wireless communication network.

FIG. 7 shows a block diagram of a DTFS-OFDM modulator that applies cyclic extension and windowing. FIG. 9 illustrates an example of a cyclic extended precoded multi-carrier signal (shown in the upper part of FIG. 9) and a window function used in the windowing or window operation (shown in the lower part of FIG. 9).

As we see from $\hat{x}=F^H_M Z=F^H_M A\hat{z}=F^H_M \Delta_H F_M x$, the interference between elements in $\hat{x}$ only disappears if the channel matrix $\Delta_H$ is a (scaled) identity matrix (since $F^H_M=I$). If this is not the case the interference between elements is determined by the properties of the matrix $F_M$. Since $F_M$ is a DFT matrix, the filter function of each row is similar to a sin c(x) function with rather slow decaying tails. This filter function has zeroes at the position of the other elements and therefore no interference is created in case of a flat channel. To reduce the spilling of interference towards other elements even for frequency-selective channels, i.e. if $\Delta_H$ is no longer a scaled identity matrix, the filter function of each row must decay faster than sin c(x). Windowing is one way to achieve this in the communication node 121, 110.

In the DFTS-OFDM modulator, shown e.g. in FIG. 7, the precoded signal $F_M x$ may be potentially cyclic extended and windowed prior to it is applied to the IDFT.

The operation of the DFTS-OFDM modulator may thus be described as Eq. 14:

$$y=F^H_N S\Delta_W \Phi F_M x, \quad (Eq.\ 14)$$

or without windowing instead as of $y=F^H_N SF_M x$.

The matrix $\Phi$ is responsible for periodically extending the precoded data, as shown in Eq. 15:

$$\Phi = \begin{bmatrix} I_M \\ I_{L_e} & 0_{L_e \times M - L_e} \end{bmatrix}, \quad (Eq.\ 15)$$

where $I_{L_e}$ and $0_{L_e \times M-L_e}$ the identity matrix of size $L_e$ and the $L_e \times M-L_e$ element all-zero matrix, respectively. The periodic extension thus repeats $L_e$ elements. Above example repeats the first $L_e$ elements, another possibility would be to repeat the last $L_e$ elements.

The diagonal matrix $\Delta_w$ comprises the $L_w=M+L_e$ element window w along its diagonal. If there is only windowing but no cyclic extension $L_e=0$ and $L_w=M$ (and $\Phi=I_M$). The matrix S maps the potentially cyclic extended and windowed data to the allocated subcarriers, i.e. S has now dimension $N\times L_w$.

Action 603

After the modulation, the communication node 121, 110 transmits the reference signal information and the data and/or control information in the modulated precoded multi-carrier symbol. In some embodiments, the precoded multi-carrier symbol may be a DFT-spread OFDM, DFTS-OFDM, symbol.

It should further be noted that a modulation scheme or precoded multi-carrier modulation scheme is herein understood to refer to schemes such as OFDM, DFTS-OFDM, FBMC, etc., which may be also referred to as "multiplexing schemes", and not to so-called constellation types such as BPSK, QPSK, 16QAM, etc.

By having a communication node 121, 110 as described in the embodiments above, different parts of a precoded multi-carrier symbol may be flexibly allocated either to a reference signal or to data and/or control information. As previously mentioned, this enables only a fraction of the precoded multi-carrier symbol to be dedicated to a reference signal, which decreases the signaling overhead of the reference signal and leaves more transmission resources to be used for data and/or control information. Hence, overhead signalling in the wireless communication network is reduced.

However, it should also be noted that on the other hand, as an option, if more energy is needed for the reference signal transmission, the reference signal duration may be increased.

To perform the method actions herein a communication node in the form of a wireless device 121 and a network node 110 are provided.

Figure 11:
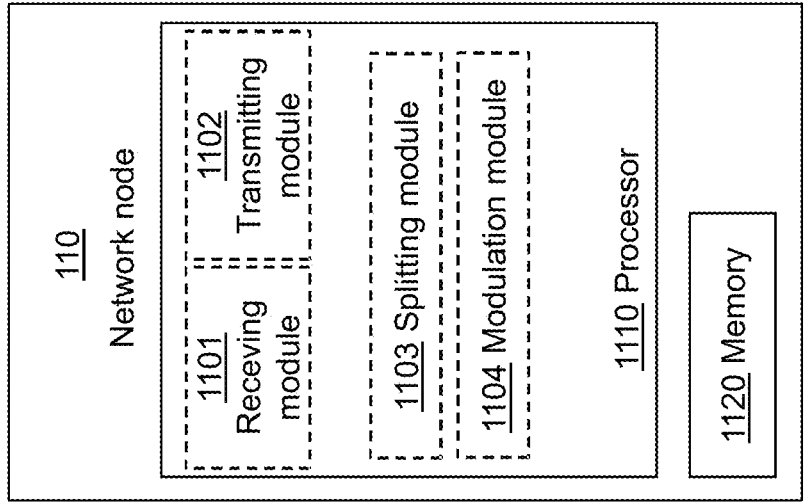
FIG. 11 is a schematic block diagram depicting embodiments of a communication node, i.e. a network node.
Figure 10:
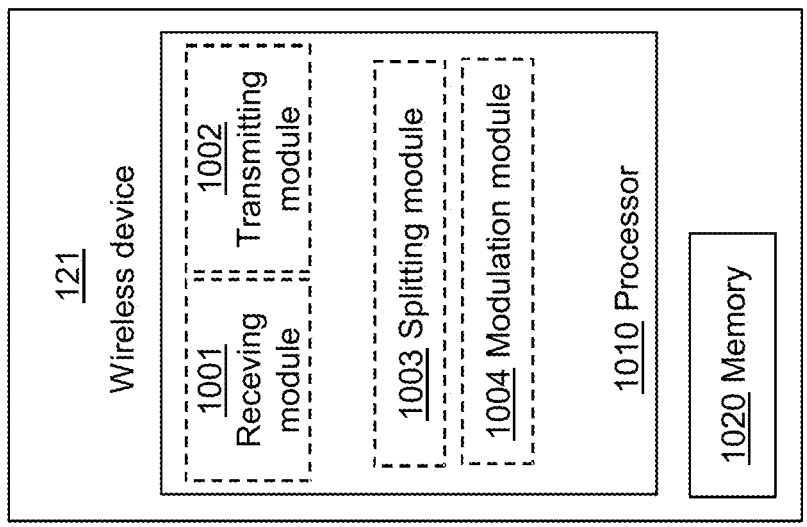
FIG. 10 is a schematic block diagram depicting embodiments of communication node, i.e. a wireless communication device.

FIGS. 10-11 are block diagrams depicting the wireless device 121 and the network node 110. The wireless device 121 is configured to perform the methods described for a communication node according to embodiments herein. The network node 110 is also configured to perform the methods described for a communication node according to embodiments herein.

The embodiments herein for transmission using a precoded multi-carrier modulation scheme in a wireless communications network 100 may be implemented through one or more processors 1010 in the wireless device 121 depicted in FIG. 10, together with computer program code for performing the functions and/or method actions of the embodiments herein. The program code mentioned above may also be provided as a computer program product, for instance in the form of a data carrier carrying computer program code for performing embodiments herein when being loaded into the wireless device 121. One such carrier may be in the form of a CD ROM disc. It is however feasible with other data carriers such as a memory stick. The computer program code may furthermore be provided as pure program code on a server and downloaded to the wireless device 121.

The wireless device 121 comprises a receiving module 1001, or receiver RX, and a transmitting module 1002, or transmitter TX, over which the wireless device 121 may transmit/receive signals to other communication nodes, such as, e.g. the network node 110 or other wireless devices or network nodes. Also, the wireless device 121 may comprise a splitting module 1003 and a modulation module 1004 for performing the transmission using a precoded multi-carrier modulation scheme in a wireless communications network 100 according to the embodiments herein.

Hence, the wireless device 121 or processing circuitry 1010 is configured to, or may comprise the splitting module 1003 configured to, split a precoded multi-carrier symbol into at least a first symbol part and at least a second symbol part. Also, the wireless device 121 or processing circuitry 1010 is configured to, or may comprise the modulation module 1004 configured to, modulate the at least first and second symbol parts such that the first symbol part of the precoded multi-carrier symbol is used for transmission of a reference signal and the second symbol part of the precoded multi-carrier symbol is used for transmission of data and/or control information. Further, the wireless device 121 or processing circuitry 1010 is configured to, or may comprise the transmitting module 1002 configured to, transmit the reference signal and the data and/or control information in the modulated precoded multi-carrier symbol.

In some embodiments, the wireless device 121 or processing circuitry 1010 may further be configured, or may comprise the splitting module 1003 being configured to, allocate different amounts of energy to the first symbol part of the precoded multi-carrier symbol and to the second symbol part of the precoded multi-carrier symbol.

In some embodiments, the wireless device 121 or processing circuitry 1010 may further be configured, or may comprise the splitting module 1003 being configured to, determine at least one guard period in the precoded multi-carrier symbol such that the total duration of the at least one guard period and the at least first and second symbol parts of the precoded multi-carrier symbol is equal to the duration of a precoded multi-carrier symbol. In this case, according to some embodiments, the wireless device 121 or processing circuitry 1010 may further be configured, or may comprise the splitting module 1003 being configured to, determine a first guard period in the precoded multi-carrier symbol located after the first symbol part of the precoded multi-carrier symbol and a second guard period in the precoded multi-carrier symbol located after the second symbol part of the precoded multi-carrier symbol. Optionally, according to some embodiments, the wireless device 121 or processing circuitry 1010 may further be configured, or may comprise the splitting module 1003 being configured to, determine a first guard period in the precoded multi-carrier symbol located after the first symbol part of the precoded multi-carrier symbol and a second guard period in the precoded multi-carrier symbol located before the second symbol part of the precoded multi-carrier symbol. In some embodiments, the at least one guard period may be a null-fix or a cyclic prefix.

In some embodiments, the wireless device 121 or processing circuitry 1010 may further be configured to, or may comprise the modulation module 1004 being configured to, apply a windowing operation in the frequency domain on the precoded multicarrier symbol. In this case, according to some embodiments, the window operation is performed using a Hamming or Hanning window. Furthermore, according to some embodiments, the precoded multi-carrier symbol may be a DFT-spread OFDM symbol.

The wireless device 121 further comprises a memory 1020. The memory 1020 may, for example, be used to store applications or programs to perform the methods herein and/or any information used by such applications or programs.

The embodiments herein for transmission using a precoded multi-carrier modulation scheme in a wireless communications network 100 may be implemented through one or more processors 1110 in the network node 110 depicted in FIG. 11, together with computer program code for performing the functions and/or method actions of the embodiments herein. The program code mentioned above may also be provided as a computer program product, for instance in the form of a data carrier carrying computer program code for performing embodiments herein when being loaded into the network node 110. One such carrier may be in the form of a CD ROM disc. It is however feasible with other data carriers such as a memory stick. The computer program code may furthermore be provided as pure program code on a server and downloaded to the network node 110.

The network node 110 comprises a receiving module 1101, or receiver RX, and a transmitting module 1102, or transmitter TX, over which the network node 110 may transmit/receive signals to other communication nodes, such as, e.g. the wireless device 121 or other wireless devices or network nodes. Also, the network node 110 may comprise a splitting module 1103 and a modulation modulation scheme in a wireless communications network 100 according to the embodiments herein.

Hence, the network node 110 or processing circuitry 1110 is configured to, or may comprise the splitting module 1103 configured to, split a precoded multi-carrier symbol into at least a first symbol part and at least a second symbol part. Also, the network node 110 or processing circuitry 1110 is configured to, or may comprise the modulation module 1104 configured to, modulate the at least first and second symbol parts such that the first symbol part of the precoded multi-carrier symbol is used for transmission of a reference signal and the second symbol part of the precoded multi-carrier symbol is used for transmission of data and/or control information. Further, the network node 110 or processing circuitry 1110 is configured to, or may comprise the transmitting module 1102 configured to, transmit the reference signal and the data and/or control information in the modulated precoded multi-carrier symbol.

In some embodiments, the network node 110 or processing circuitry 1110 may further be configured, or may comprise the splitting module 1103 being configured to, allocate different amounts of energy to the first symbol part of the precoded multi-carrier symbol and to the second symbol part of the precoded multi-carrier symbol.

In some embodiments, the network node 110 or processing circuitry 1110 may further be configured, or may comprise the splitting module 1103 being configured to, determine at least one guard period in the precoded multi-carrier symbol such that the total duration of the at least one guard period and the at least first and second symbol parts of the precoded multi-carrier symbol is equal to the duration of a precoded multi-carrier symbol. In this case, according to some embodiments, the network node 110 or processing circuitry 1110 may further be configured, or may comprise the splitting module 1103 being configured to, determine a first guard period in the precoded multi-carrier symbol located after the first symbol part of the precoded multi-carrier symbol and a second guard period in the precoded multi-carrier symbol located after the second symbol part of the precoded multi-carrier symbol. Optionally, according to some embodiments, the network node 110 or processing circuitry 1110 may further be configured, or may comprise the splitting module 1103 being configured to, determine a first guard period in the precoded multi-carrier symbol located after the first symbol part of the precoded multi-carrier symbol and a second guard period in the precoded multi-carrier symbol located before the second symbol part of the precoded multi-carrier symbol. In some embodiments, the at least one guard period may be a null-fix or a cyclic prefix.

In some embodiments, the network node 110 or processing circuitry 1110 may further be configured to, or may comprise the modulation module 1104 being configured to, apply a windowing operation in the frequency domain on the precoded multicarrier symbol. In this case, according to some embodiments, the window operation is performed using a Hamming or Hanning window. Furthermore, according to some embodiments, the precoded multi-carrier symbol may be a DFT-spread OFDM symbol.

The network node 110 further comprises a memory 1120. The memory 1120 may, for example, be used to store applications or programs to perform the methods herein and/or any information used by such applications or programs. The network node 110 may further comprise an input/output interface (not shown), which may be used to communicate over a wired connection with other radio network entities or nodes in the wireless communications network 100.

As will be readily understood by those familiar with communications design, that functions from other circuits may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless terminal or network node, for example.

Alternatively, several of the functional elements of processing circuits discussed may be provided through the use of dedicated hardware, while others are provided with hardware for executing software, in association with the appropriate software or firmware. Thus, the term "processor" or "controller" as may be used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications receivers will appreciate the cost, performance, and maintenance trade-offs inherent in these design choices. The different actions taken by the different nodes may be implemented with different circuits.

From the above it may be seen that the embodiments may further comprise a computer program product, comprising instructions which, when executed on at least one processor, e.g. the processors 1010, 1110, cause the at least one processor to carry out the method for enabling improved random access transmissions in a radio communications network 100. Also, some embodiments may, as described above, further comprise a carrier containing said computer program, wherein the carrier is one of an electronic signal, optical signal, radio signal, or computer readable storage medium.

The terminology used in the detailed description of the particular embodiments illustrated in the accompanying drawings is not intended to be limiting of the described communication node or method therein.

As used herein, the term "and/or" comprises any and all combinations of one or more of the associated listed items. Further, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation. The common abbreviation "etc.", which derives from the Latin expression "et cetera" meaning "and other things" or "and so on" may have been used herein to indicate that further features, similar to the ones that have just been enumerated, exist.

As used herein, the singular forms "a", "an" and "the" are intended to comprise also the plural forms as well, unless expressly stated otherwise. It will be further understood that the terms "includes," "comprises," "including" and/or "comprising," when used in this specification, specify the presence of stated features, actions, integers, steps, operations, elements, and/or components, but do not preclude the presence or addition of one or more other features, actions, integers, steps, operations, elements, components, and/or groups thereof.

Unless otherwise defined, all terms comprising technical and scientific terms used herein have the same meaning as commonly understood by one of ordinary skill in the art to which the described embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The embodiments herein are not limited to the above described preferred embodiments. Various alternatives, modifications and equivalents may be used. Therefore, the above embodiments should not be construed as limiting.

ABBREVIATIONS

ACK/NACK Acknowledgement/Non-acknowledgement
AgN Aggregation node
AN Access node
DFT Discrete Fourier Transform
DFTS-OFDM DFT Spread OFDM
FEC Forward error correction
FBMC Filter Bank Multi-Carrier
IDFT Inverse Discrete Fourier Transform
OFDM Orthogonal Frequency Division Multiplex
PAPR Peak-to-Average Power Ratio
Rx Receive, receiver
TDD Time-division duplex
Tx Transmit, transmitter
UE User equipment

The invention claimed is:

1. A method performed by a communication node for transmission using a precoded multi-carrier modulation scheme in a wireless communications network, the method comprising:
    splitting a precoded multi-carrier symbol into at least a first symbol part and at least a second symbol part;
    determining a first guard period in the precoded multi-carrier symbol located after the first symbol part of the precoded multi-carrier symbol and a second guard period in the precoded multi-carrier symbol located one of before or after the second symbol part of the precoded multi-carrier symbol;
    modulating the at least first and second symbol parts such that the first symbol part of the precoded multi-carrier symbol is used for transmission of a reference signal and the second symbol part of the precoded multi-carrier symbol is used for transmission of data and/or control information; and
    transmitting the reference signal and the data and/or control information in the modulated precoded multi-carrier symbol including the modulated first symbol part and the second symbol part.

2. A method performed by a communication node for transmission using a precoded multi-carrier modulation scheme in a wireless communications network, the method comprising:
    splitting a precoded multi-carrier symbol into at least a first symbol part and at least a second symbol part;
    adjusting a first length of the first symbol part of the precoded multi-carrier symbol and a second length of the second symbol part of the precoded multi-carrier symbol to allocate different amounts of energy to the first symbol part of the precoded multi-carrier symbol and to the second symbol part of the precoded multi-carrier symbol;
    modulating the at least first and second symbol parts such that the first symbol part of the precoded multi-carrier symbol is used for transmission of a reference signal and the second symbol part of the precoded multi-carrier symbol is used for transmission of data and/or control information; and
    transmitting the reference signal and the data and/or control information in the modulated precoded multi-carrier symbol including the modulated first symbol part and the second symbol part.

3. A method according to claim 1, wherein determining the first and second guard periods in the precoded multi-carrier symbol comprises determining the first and second guard periods such that the total duration of the first and second guard periods and the at least first and second symbol parts of the precoded multi-carrier symbol is equal to the duration of a precoded multi-carrier symbol.

4. A method according to claim 3,
    wherein the first guard period is located between the first symbol part and the second symbol part; and
    wherein the second guard period in the precoded multi-carrier symbol is located after the second symbol part of the precoded multi-carrier symbol.

5. A method according to claim 3,
    wherein the first guard period is located between the first symbol part and the second symbol part; and
    wherein the second guard period in the precoded multi-carrier symbol is located before the second symbol part of the precoded multi-carrier symbol, wherein each of the first guard period and the second guard period is a cyclic prefix.

6. A method according to claim 1, wherein each of the first guard period and the second guard period is a null-fix prefix.

7. A method according to claim 1, further comprising:
    applying windowing operation in the frequency domain on the precoded multi-carrier symbol.

8. A method according to claim 7, wherein the window operation is performed using a Hamming or Hanning window.

9. A method according to claim 1, wherein the precoded multi-carrier symbol is a discrete Fourier transform (DFT)-spread orthogonal frequency division multiplexed (OFDM) symbol.

10. A method according to claim 1, wherein the communication node is a wireless device or a network node in the wireless communication network.

11. A communication node for transmission using a precoded multi-carrier modulation scheme in a wireless communications network, the communication node is configured to:
    split a precoded multi-carrier symbol into at least a first symbol part and at least a second symbol part;
    determine a first guard period in the precoded multi-carrier symbol located after the first symbol part of the precoded multi-carrier symbol and a second guard period in the precoded multi-carrier symbol located one of before or after the second symbol part of the precoded multi-carrier symbol;
    modulate the at least first and second symbol parts such that the first symbol part of the precoded multi-carrier symbol is used for transmission of a reference signal and the second symbol part of the precoded multi-carrier symbol is used for transmission of data and/or control information; and transmit the reference signal and the data and/or control information in the modulated precoded multi-carrier symbol including the modulated first symbol part and the second symbol part.

12. A communication node according to claim 11, further configured to:

adjust a first length of the first symbol part of the precoded multi-carrier symbol and a second length of the second symbol part of the precoded multi-carrier symbol to allocate different amounts of energy to the first symbol part of the precoded multi-carrier symbol and to the second symbol part of the precoded multi-carrier symbol.

13. A communication node according to claim 11, further configured to determine the first guard period and the second guard period by:

determining the first and second guard periods in the precoded multi-carrier symbol such that the total duration of the first and second guard periods and the at least first and second symbol parts of the precoded multi-carrier symbol is equal to the duration of a precoded multi-carrier symbol.

14. A communication node according to claim 13, wherein the first guard period is located between the first symbol part and the second symbol part; and wherein the second guard period in the precoded multi-carrier symbol is located after the second symbol part of the precoded multi-carrier symbol.

15. A communication node according to claim 13, wherein the first guard period is located between the first symbol part and the second symbol part; and wherein the second guard period in the precoded multi-carrier symbol is located before the second symbol part of the precoded multi-carrier symbol, wherein each of the first guard period and the second guard period is a cyclic prefix.

16. A communication node according to claim 13, wherein each of the first guard period and the second guard period is a null-fix prefix.

17. A communication node according to claim 11, further configured to:

apply a windowing operation in the frequency domain on the precoded multi-carrier symbol.

18. A communication node according to claim 17, wherein the window operation is performed using a Hamming or Hanning window.

19. A communication node according to claim 11, wherein the precoded multi-carrier symbol is a discrete Fourier transform (DFT)-spread orthogonal frequency division multiplexed (OFDM) symbol.

20. A computer program product embodied on a non-transitory computer readable medium, the computer program product comprising instructions which, when executed on at least one processor coupled to the non-transitory computer readable medium, cause the at least one processor to carry out the method according to claim 1.

21. The method according to claim 1, further comprising:

adjusting a first length of the first symbol part of the precoded multi-carrier symbol and a second length of the second symbol part of the precoded multi-carrier symbol to allocate different amounts of energy to the first symbol part of the precoded multi-carrier symbol and to the second symbol part of the precoded multi-carrier symbol.

* * * * *